US012791286B2

(12) United States Patent
Al-Ameri

(10) Patent No.: US 12,791,286 B2
(45) Date of Patent: Nov. 10, 2026

(54) SYSTEM INTEGRATION

(71) Applicant: BAE SYSTEMS plc, London (GB)

(72) Inventor: Monadl Abd Al-Abbas Mansour Al-Ameri, Preston Lancashire (GB)

(73) Assignee: BAE SYSTEMS PLC, London (GB)

( * ) Notice: Subject to any disclaimer, the term of this patent is extended or adjusted under 35 U.S.C. 154(b) by 36 days.

(21) Appl. No.: 18/841,142

(22) PCT Filed: Feb. 22, 2023

(86) PCT No.: PCT/GB2023/050404
§ 371 (c)(1),
(2) Date: Aug. 23, 2024

(87) PCT Pub. No.: WO2023/161629
PCT Pub. Date: Aug. 31, 2023

(65) Prior Publication Data

US 2025/0189270 A1 Jun. 12, 2025

(30) Foreign Application Priority Data

Feb. 24, 2022 (EP) .................................... 22275020
Feb. 24, 2022 (EP) .................................... 22275021
(Continued)

(51) Int. Cl.
*F41G 7/00* (2006.01)
*B64D 45/00* (2006.01)
(Continued)

(52) U.S. Cl.
CPC ............... *F41G 3/22* (2013.01); *B64D 45/00* (2013.01); *F41G 7/007* (2013.01); *F41G 9/002* (2013.01);
(Continued)

(58) Field of Classification Search
CPC . F41G 3/22; F41G 7/007; F41G 9/002; F41G 3/00; F41G 7/00; F41G 9/00;
(Continued)

(56) References Cited

U.S. PATENT DOCUMENTS

2019/0154402 A1 5/2019 Rowlands
2025/0189270 A1* 6/2025 Al-Ameri ................ F41G 3/00

FOREIGN PATENT DOCUMENTS

EP 2876402 A1 5/2015
EP 3074713 A1 10/2016
(Continued)

OTHER PUBLICATIONS

International Search Report and Written Opinion dated May 12, 2023 issued in PCT/GB2023/050402.
(Continued)

*Primary Examiner* — Matthew Mikels
(74) *Attorney, Agent, or Firm* — Scully, Scott, Murphy & Presser, P.C.

(57) ABSTRACT

A feasibility display indicative of a feasibility of a weapon successfully engaging a target and/or a feasibility of a weapon successfully engaging the aircraft is generated. The aircraft in conjunction with another device cooperatively generate the same. The another device has a database describing a performance envelope of the weapon. The another device identifies a best candidate polynomial from a plurality based on scores of the plurality. Each score is based on a quality of fit of the candidate polynomial to a characteristic of the performance envelope of the weapon. The another device uploads, after a plurality of characteristics are evaluated, to the aircraft coefficients which are determined for the best candidate polynomial Variables of the plurality are some or all of a weapon or aircraft firing condition parameters. The aircraft uses selected coefficients to gener-
(Continued)

ate the feasibility display where selection is based on conditions of the aircraft and target.

16 Claims, 9 Drawing Sheets

(30) Foreign Application Priority Data

| | | |
|---|---|---|
| Feb. 24, 2022 | (EP) | 22275022 |
| Feb. 24, 2022 | (GB) | 2202534 |
| Feb. 24, 2022 | (GB) | 2202535 |
| Feb. 24, 2022 | (GB) | 2202536 |

(51) Int. Cl.

| | |
|---|---|
| ***F41G 3/22*** | (2006.01) |
| ***F41G 9/00*** | (2006.01) |
| ***G06F 17/11*** | (2006.01) |
| ***G06N 3/086*** | (2023.01) |
| ***G06N 3/126*** | (2023.01) |

(52) U.S. Cl.
CPC ............. *G06N 3/086* (2013.01); *G06N 3/126* (2013.01); *G06F 17/11* (2013.01)

(58) Field of Classification Search
CPC ........ B64D 45/00; G06N 3/086; G06N 3/126; G06N 3/04; G06F 17/11
See application file for complete search history.

(56) References Cited

FOREIGN PATENT DOCUMENTS

| | | |
|---|---|---|
| EP | 3449203 B1 | 5/2020 |
| GB | 2551626 A | 12/2017 |

OTHER PUBLICATIONS

International Search Report and Written Opinion dated May 23, 2023 issued in PCTGB2023050403.
International Search Report and Written Opinion dated May 12, 2023 issued in PCTGB2023050404.
Extended European Search Report dated Aug. 5, 2022 issued in EP 22275020.0.
Extended European Search Report dated Aug. 5, 2022 issued in EP 22275022.6.
Extended European Search Report dated Aug. 5, 2022 issued in EP 22275021.8.
GB Search Report dated Aug. 23, 2022 issued in GB 2202534.0.
GB Search Report dated Aug. 23, 2022 issued in GB 2202535.7.
GB Search Report dated Aug. 23, 2022 issued in GB 2202536.5.
Park et al., "Evolutionary design of hybrid self-organizing fuzzy polynomial neural networks with the aid of information granulation", Expert Systems With Applications, Elsevier, Amsterdam, NL, vol. 33, No. 4, Mar. 30, 2007 (Mar. 30, 2007) , pp. 830-846, XP022067142, ISSN: 0957-4174, DOI: 10.1016/J.ESWA.2006.07.006.
Hayashida, T. et al., "Development of Island Model Genetic Algorithms with Different Genetic Operators", IEEJ Transactions on Electronics, Information, and Systems, 2021, pp. 1430-1436, vol. 141, No. 12.

* cited by examiner

SYSTEM INTEGRATION

FIELD

This invention relates to the integration of systems and, more particularly, to the integration of weapons on complex, highly integrated aircraft.

BACKGROUND

Integration of a weapon system with the other systems on an aircraft is a complex and lengthy task, as it affects all the major aircraft systems. Accordingly, there is a requirement to improve weapon integration time and affordability.

One of the requirements of weapon integration is to enable the display of information to the aircraft pilot as to whether or not a weapon is capable of successfully engaging a particular target. For this purpose, weapons are usually grouped into two categories, weapons designed to engage targets on the ground (air to ground weapons) and weapons designed to engage targets in the air (air to air weapons). In the case of air to ground weapons, a Launch Acceptability Region (LAR) is calculated, being the region where the probability of successfully engaging or hitting a selected target is above some threshold value. The LAR is calculated in order to provide cockpit displays in the launch aircraft indicating the feasibility of successfully engaging the target, and is a function of the weapon performance characteristics, the relative positions and motions of the aircraft and the target, and often ambient conditions such as wind speed and direction.

For an air-to-air weapon, a Launch Success Zone (LSZ) is calculated, indicative of the probability of successfully engaging a selected air target being above some threshold value. Again, the LSZ is used to provide a cockpit display indicating whether the weapon is capable of successfully engaging the target. However, calculation of an LSZ is more complicated than the calculation of an LAR because the relative speeds and directions of travel of the launch aircraft and the target are much greater, the effects of ambient conditions are greater, and also the physical properties of the weapons in flight are more significant on the calculation.

The conventional approach has been to create a simple, abstract model of the weapon, which is modified according to the launch conditions (taking into account the aircraft and target conditions (e.g. range, direction and speed of travel, etc.) and the ambient conditions). The model is used on board the aircraft to generate the LAR or LSZ for display to the pilot. A disadvantage of the conventional approach is that each model, for each different weapon type, is different. Storing the data relating to several different implicit models consumes significant storage capacity, and each model has to be comprehensively integrated to ensure that there is no adverse effect on any of the aircraft systems. Further, if there are any changes or modifications made to a weapon (such as an improvement in performance) or if it is necessary to load the aircraft with a completely new weapon, a lengthy and expensive integration process has to be conducted because the weapon model is substantially different to anything previously integrated with the aircraft systems.

SUMMARY

According to a first aspect of the present invention, there is provided a computer-implemented method of generating, in an aircraft in flight, a feasibility display indicative of a feasibility of a weapon carried on the aircraft successfully engaging a target and/or a feasibility of a weapon carried on the target successfully engaging the aircraft, the method comprising:

providing a database describing a performance envelope of the weapon;

creating coefficients characteristic of that performance envelope using a generic algorithm, wherein the generic algorithm has the form of a polynomial, by steps including:

a) generating candidate polynomials, the variables of the polynomials being some or all of a group of weapon or aircraft firing condition parameters;

b) for each candidate polynomial, computing coefficients for that candidate polynomial which best fit that candidate polynomial to a characteristic of the performance envelope of the weapon using a criterion of least square error;

c) for each candidate polynomial, generating a candidate score according to the quality of the fit of that candidate polynomial to the characteristic of the performance envelope of the weapon;

d) applying a genetic algorithm to the candidate polynomials and scores including selecting the best scoring polynomial(s) and discarding the other polynomial(s), thereby identifying a best candidate polynomial and coefficients thereof; and e) repeating said identifying process until all the required characteristics of the performance envelope have corresponding polynomial models;

uploading, to the aircraft, the coefficients of the identified best candidate polynomial; and selecting, by a reconstructor on the aircraft containing the same generic algorithm, the coefficients for the generic algorithm according to conditions of the aircraft and the target; and using the selected coefficients, generating, by the reconstructor, the feasibility display;

characterised by:

wherein step d) applying the genetic algorithm to the candidate polynomials and scores comprises:

i) defining a set of orders and/or types of the candidate polynomials and dividing the defined set of orders and/or types into a plurality of sub-sets thereof;

ii) iteratively applying the genetic algorithm concurrently over the plurality of sub-sets of the defined set of orders and/or types of the candidate polynomials, including iteratively applying the genetic algorithm over the variables of the polynomials for each order and/or type of the respective sub-set thereof and saving the resulting respective coefficients and scores thereof; and iii) selecting the best scoring polynomial(s) using the saved coefficients and scores and discarding the other polynomial(s), thereby identifying the best candidate polynomial and coefficients thereof; and wherein selecting, by the reconstructor on the aircraft containing the same generic algorithm, the coefficients for the generic algorithm according to conditions of the aircraft and the target comprises selecting, by the reconstructor on the aircraft containing the same generic algorithm, the coefficients for the generic algorithm, if the aircraft and the target are within the performance envelope of the weapon, according to the conditions of the aircraft and the target.

In this way, the method significantly improves weapon integration time and cost. In more detail, typically a genetic algorithm proceeds in an iterative manner by generating new populations of strings from old ones. Every string is the encoded version of a tentative solution. An evaluation function associates a fitness measure to every string indicating its suitability to the problem. The algorithm applies stochastic operators such as selection, crossover and mutation on an initially random population in order to compute a whole generation of new strings. The inventors have identified that these algorithms may be adapted for use on multiple processor workstations or distributed systems with transparent process migration. Every fitness evaluation and adaptation operation may be performed within a separate process i.e. concurrently. In the case of a trivial fitness function, it is likely that not much improvement in the evolution's speed will be observed because of the level of overhead. However, for weapon aiming and many tasks on certain systems, this is obviously time consuming, reflecting the ad hoc nature of the solution process. The accuracy of the fitting depends on the complexity of the performance envelope. To represent the performance envelope accurately and achieve the required accuracy for the whole or a subset of the envelope large data sets may be required. As the data size increase, the amount of computation and the processing time grow faster. The benefits of having the fitness evaluations occur in parallel are significant.

In order to apply genetic algorithms to a particular application, an internal representation of the space to be searched is selected and an external function that assigns a fitness value to candidate solutions is defined. The inventors have adapted the genetic algorithm to parallelise over the many polynomial orders (also known as degrees) and input parameters that the genetic algorithm has to run. Each run tests several parameter combinations of polynomial order and inputs, reporting on the execution time, memory and flops operations for the final model requirement to solve the problem for each parameter combination, as described below in more detail.

The method can be used for different weapon types, and a respective set of coefficients may be easily determined for each weapon type e.g. for each of a plurality of different firing conditions (i.e. aircraft and target conditions). The aircraft and target conditions may include but are not limited to one or more of their relative positions, distances, directions of movement, speeds and ambient atmospheric conditions. The weapon or aircraft firing condition parameters may include, but are not limited to, parameters such as aircraft velocities, aircraft height, aircraft attitude, slant range to target, target velocities, target height, line of sight azimuth, target pitch and aspect angles, and wind speed. The weapon or aircraft firing condition parameters may include, but are not limited to relative velocities and directions of travel of the launch aircraft and the target and those of the weapon relative to the target.

Advantageously, the above described generic polynomial/algorithm may be used (e.g. simultaneously) by multiple different types of aircraft. In other words, different types of aircraft may use the same generic algorithm to calculate LARs/LSZs. Also, the same generic algorithm may be used to calculate LARs/LSZs for different weapon types. Thus, aircraft software comprising the generic polynomial and means for allowing loading of coefficients for each weapon loaded on aircraft is produced only once. The software algorithm and coefficients, for any given weapon, are the same for any aircraft type. This tends to be different to conventional methodologies in which, although common tools may be used for polynomial and coefficient generation, both the software (including an algorithm/polynomial) and coefficients are generated for every weapon type and every time the weapon performance is changed. This need to rewrite the software and the certification of it tends to be particularly costly. The above described method and system advantageously tend to provide that the aircraft software does not have to be rewritten and hence no new certification is required.

In some embodiments, each aircraft within a fleet comprising a plurality of different aircraft is loaded with the same, common generic polynomial. When a weapon is loaded onto an aircraft in the fleet, the specific coefficients corresponding to that weapon may also be loaded onto that aircraft. This tends to be in contrast to conventional systems in which, although the tools for generating LAR/LSZs may be common across multiple different aircraft, when a weapon is loaded onto an aircraft, both a polynomial/algorithm and corresponding coefficients for generating LAR/LSZs are generated for that aircraft and weapon loadout.

The coefficients can be implemented as loadable data so as to allow accurate and precise weapon behaviour to be implemented within the weapon system. Also, using one or only a few generic algorithms would allow different weapon systems to be cleared or certificated/qualified for use with the aircraft with reduced effort and more quickly than with the extensive testing which is required with conventional approaches. That is, a minimal number of generic weapon aiming algorithms may be used in order to take account of all weapon types.

The use of generic algorithms for weapon aiming also enables increases or significant changes in weapon system capability to be integrated with the aircraft systems with significantly less effort than heretofore.

By determining a feasibility of a weapon carried on the target successfully engaging the aircraft, it is displayed whether or not, or to what extent, the aircraft is at risk of being successfully engaged by a weapon carried by a hostile target. This calculation of opposing LSZs/MEZs and allows better assessment of engagements. This in turn could lead to confident predictions of advantage and likely outcome of engagements.

Advantageously, the above aspects provide a generic polynomial/algorithm that may be used (e.g. simultaneously) by multiple different types of aircraft. Different types of aircraft may use the same generic algorithm to calculate LARs/LSZs. Also, the same generic algorithm may be used to calculate LARs/LSZs for different weapon types. Thus, aircraft software comprising the generic polynomial and means for allowing loading of coefficients for each weapon loaded on aircraft is produced only once. The software algorithm and coefficients, for any given weapon, are the same for any aircraft type. This tends to be different to conventional methodologies in which, although common tools may be used for polynomial and coefficient generation, both the software (including an algorithm/polynomial) and coefficients are generated for every weapon type and every time the weapon performance is changed. This need to rewrite the software and the certification of it tends to be particularly costly. The above described method and system advantageously tend to provide that the aircraft software does not have to be rewritten and hence no new certification is required.

In one example, iteratively applying the genetic algorithm concurrently over the plurality of sub-sets of the defined set of orders and/or types of the candidate polynomials comprises iteratively applying the genetic algorithm concurrently over the plurality of sub-sets of the defined set of orders and/or types of the candidate polynomials on respective processors and/or different threads.

In this way, iteratively applying the genetic algorithm concurrently is enhanced since the genetic algorithm is iteratively applied on the respective threads and/or processors.

In one example, iteratively applying the genetic algorithm over the variables of the polynomials for each order and/or type of the respective sub-set thereof comprises:

selecting combinations of the variables of the polynomials for each order and/or type of the respective sub-set thereof; and iteratively applying the genetic algorithm over the selected combinations of the variables of the polynomials for each order and/or type of the respective sub-set thereof.

In this way, the genetic algorithm is iteratively applied over the selected combinations of the variables (also known as inputs) of the polynomials, for example only to the selected combinations of the variables of the polynomials, thereby accelerating the method.

In one example, iteratively applying the genetic algorithm over the selected combinations of the variables of the polynomials for each order and/or type of the respective sub-set thereof comprises iteratively applying the genetic algorithm concurrently over the selected combinations of the variables of the polynomials for each order and/or type of the respective sub-set thereof.

In this way, the genetic algorithm is iteratively applied over the selected combinations of the variables of the polynomials for each order and/or type of the respective sub-set thereof concurrently, thereby accelerating the method.

In one example, iteratively applying the genetic algorithm concurrently over the selected combinations of the variables of the polynomials for each order and/or type of the respective sub-set thereof comprises iteratively applying the genetic algorithm concurrently over the selected combinations of the variables of the polynomials for each order and/or type of the respective sub-set thereof on respective threads and/or processors.

In this way, iteratively applying the genetic algorithm concurrently is enhanced since the genetic algorithm is iteratively applied on the respective threads and/or processors.

In one example, iteratively applying the genetic algorithm concurrently over the plurality of sub-sets of the defined set of orders and/or types of the candidate polynomials, including iteratively applying the genetic algorithm over the variables of the polynomials for each order and/or type of the respective sub set thereof and saving the resulting respective coefficients and scores thereof comprises conditionally iteratively applying the genetic algorithm concurrently over the plurality of sub-sets of the defined set of orders and/or types of the candidate polynomials, including iteratively applying the genetic algorithm over the variables of the polynomials for each order and/or type of the respective sub set thereof and saving the resulting respective coefficients and scores thereof.

In this way, iteratively applying the genetic algorithm concurrently over the plurality of sub-sets of the defined set of orders and/or types of the candidate polynomials is conditional, for example upon not meeting a predetermined threshold, thereby accelerating terminating of an iteration, for example.

In one example, conditionally iteratively applying the genetic algorithm concurrently over the plurality of sub-sets of the defined set of orders and/or types of the candidate polynomials comprises terminating applying the genetic algorithm over the variables of the polynomials for each order and/or type of the respective sub-set thereof if the respective scores do not meet a threshold.

In one example, the threshold is predetermined.

In one example, the method comprises determining the threshold based on a previous score.

In this way, applying the genetic algorithm over the variables of the polynomials for each order and/or type of the respective sub-set thereof is terminated if the respective scores do not meet a previous score i.e. do not improve a fit.

In one example, the types of the candidate polynomials of the set thereof include univariate polynomials, multivariate polynomials and modifications thereof. Other polynomial types are known.

In one example, the orders of the candidate polynomials of the set thereof are in a range from 1 to 100, preferably in a range from 2 to 25, more preferably in a range from 3 to 10, most preferably in a range from 5 to 9, for example 5, 6, 7, 8, 9.

In one example, the generic polynomial (i.e. wherein the generic algorithm has the form of a polynomial) is of the form:

$$y_n = \sum_{m=1}^{M_n} \alpha_{mn} x_1^{p_{1mn}} x_2^{p_{2mn}}$$

where:

$\alpha_{mn}$ represent the m coefficients required to compute output n;

$\{x_1 \ldots x_{Ni}\}$ represent the normalised inputs;

$\{y_1 \ldots y_{Ni}\}$ represent the outputs; and $p_{1mn}$ represents the power (exponent) of the $x_1$ variable of the $m^{th}$ term of the $n^{th}$ polynomial.

In one example, the best candidate polynomial is of the form:

$$y = \sum_{n=1}^{M} \alpha_m y_1^{p_{1m}} y_2^{p_{2m}} y_3^{p_{3m}}$$

where:

$$y_1 = \sum_{i=1}^{I} \alpha_i x_1^{p_{1i}} x_2^{p_{2i}} x_3^{p_{3i}}$$

$$y_2 = \sum_{j=1}^{J} \alpha_j x_1^{p_{1j}} x_2^{p_{2j}} x_3^{p_{3j}}$$

$$y_3 = \sum_{k=1}^{J} \alpha_k x_1^{p_{1k}} x_2^{p_{2k}} x_3^{p_{3k}}$$

In one example, the order of the generic polynomial is 3 or greater. In one example, the order of the generic polynomial is in a range from 10 to 25, for example 20. Surprisingly, the inventors have found that using a generic algorithm with an order of around 20 adequately describes most air-to-air engagements accurately in an appropriate runtime for on-aircraft implementation. Nevertheless, the generic algorithm may have an order greater than 2.

In one example, step b) for each candidate polynomial, computing coefficients for that candidate polynomial which best fit that candidate polynomial to the characteristic of the performance envelope of the weapon using the criterion of least square error comprises: 1) generating an initial population of candidate polynomials; 2) for each candidate polynomial, computing a set of coefficients which fit that polynomial to the performance envelope according to one or more criteria; and 3) for each candidate polynomial and respective set of coefficients, computing a score function indicative of the quality of the fit of that candidate polynomial and that set of coefficients to the performance envelope; and 4) recursively applying a genetic algorithm to the set of candidate polynomials until one or more criteria are met, including retaining at least the best scoring polynomial and discarding the other polynomial(s). In one example, the outputs of the retained polynomial(s) are a layer of a Self-Organising Polynomial Neural Network and are used to provide inputs for creating higher order candidate polynomials. In one example, these steps are iterated on the higher order candidate polynomials. In one example, a final result is obtained from the path ending with the best candidate score.

In one example, the target comprises and/or is an aircraft. In one example, the feasibility display is indicative of a Launch Success Zone of the aircraft and/or the target.

In one example, the target comprises and/or is a ground-based target. In one example, the feasibility display is indicative of a Launch Acceptability Region of the aircraft and/or a Missile Engagement Zone of the target.

In one example, step b) for each candidate polynomial, computing coefficients for that candidate polynomial which best fit that candidate polynomial to the characteristic of the performance envelope of the weapon using the criterion of least square error comprises:

- generating an initial population of candidate polynomials;
- for each candidate polynomial, computing a set of coefficients which fit that polynomial to the performance envelope according to one or more criteria (e.g. a least squares criterion);
- for each candidate polynomial and respective set of coefficients, computing a score function indicative of the quality of the fit of that candidate polynomial and that set of coefficients to the performance envelope; and
- recursively applying a genetic algorithm to the set of candidate polynomials until one or more criteria are met, including retaining at least the best scoring polynomial and discarding the other polynomial(s).

In one example, the outputs of the retained polynomial(s) are a layer of a Self-Organising Polynomial Neural Network and are used to provide inputs for creating higher order candidate polynomials. In one example, these are iterated until a final result having the best candidate score is obtained.

In one example, the performance envelope of the weapon is the weapon's performance, for example the minimum envelope defining the weapon's performance, when the weapon is implemented on the aircraft. In one example, the performance envelope of the weapon is the weapon's respective performance when the weapon is implemented on aircraft of different aircraft types. In one example, the method comprises acquiring respective performance envelopes for one or more different aircraft types, for example for a plurality of different aircraft types.

In one example, the method comprises determining the performance envelope using a plurality of aircraft performance envelopes, including determining a performance envelope defining the performance of all of the different aircraft types (i.e. a "maximum aircraft performance envelope"), and, using the performance envelope that is representative of the performance of all of the different aircraft types and the weapon performance envelope, determining a performance envelope defining the weapon's performance when that weapon is implemented on each of the different aircraft types. In one example, the performance envelope is the minimum sized envelope that defines the weapon's performance when that weapon is implemented on each of the different aircraft types.

In some aspects, a database is generated by: defining the range of conditions for which the weapon may be required to be fired, the range of aircraft conditions for which it is feasible for the aircraft to fire the weapon and the range of weapon conditions for which it is feasible to fire the weapon; generating data indicative of the weapon performance for each weapon firing possibility from within the defined ranges; and creating a database defining the weapon's overall performance envelope. The coefficients may then be determined from this database and the generic polynomial. In this way the database can be generated on a ground-based system, so that the aircraft system needs the capacity only to store the generic polynomial and process the coefficients with the aircraft and target conditions in order to generate the feasibility display. Thus, the amount of data storage/processing capacity required on the aircraft tends to be reduced.

The coefficients can be implemented as loadable data so as to allow accurate and precise weapon behaviour to be implemented within the weapon system. Also, using one or only a few generic algorithms would allow different weapon systems to be cleared or certificated/qualified for use with the aircraft with reduced effort and more quickly than with the extensive testing which is required with conventional approaches.

The step of uploading, to the aircraft, the generated coefficients may be performed when the weapon is loaded as an aircraft store. When loading a new weapon store, to integrate the weapon and aircraft aiming system, the coefficients associated with that weapon may be uploaded to the aircraft at the same time as the weapon. Preferably, the coefficients are stored on a hardware device with the weapon, and the device is connected to the aircraft to upload the coefficient data as the weapon is loaded.

In this way, a Capability Filter (CF) is provided that finds the limits of the capable envelope of a weapon system in any chosen region of the engagement envelope and examines the feasibility of weapon engagement for current launch conditions—i.e. for finding out if the current firing is inside or outside the "hit zone" for the weapon. This offers the prospect of classifying large, highly dimensional spaces using relatively concise models, thus saving in both processing and storage for the host system. Firstly, the capability filter assesses whether or not the weapon has capability. Secondly, if the weapon has capability, the relevant LSZ/LAR parameters are then estimated.

In one example, the method comprises inferring if the aircraft and the target are within the performance envelope of the weapon, according to the conditions of the aircraft and the target, using a trained machine learning model, for example a trained neural network.

In this way, whether or not the aircraft and the target are within the performance envelope of the weapon, according to the conditions of the aircraft and the target, may be determined.

In one example, the method comprises training the machine learning model using training data of performance envelopes of respective weapons, according to conditions of respective aircraft and respective targets.

In this way, the machine learning model may be trained using training data of performance envelopes of respective weapons, according to conditions of respective aircraft and respective targets.

In one example, the method comprises labelling the training data based on if the respective aircraft and the respective target are within the performance envelope of the respective weapon, according to the conditions of the respective aircraft and the respective target.

In this way, the training data may be labelled, for example capability=1 while no capability=0.

In one example, the method comprises creating respective coefficients characteristic of the performance envelopes using the generic algorithm, by steps including identifying respective best candidate polynomials from a plurality of candidate polynomials, the variables of the polynomials being some or all of a group of respective weapon or aircraft firing condition parameters.

In this way, the respective coefficients are created for the training data, for example in the same way as for the performance envelope of the weapon.

In one example, inferring if the aircraft and the target are within the performance envelope of the weapon, according to the conditions of the aircraft and the target, using the trained machine learning model, comprises thresholding a result of the inferring.

In this way, a binary output, for example capability=1 while no capability=0, may be determined from the result of the inferring.

In one example, selecting, by the reconstructor on the aircraft containing the same generic algorithm, the coefficients for the generic algorithm, if the aircraft and the target are within the performance envelope of the weapon, according to the conditions of the aircraft and the target, comprises selecting, by the reconstructor on the aircraft containing the same generic algorithm, the coefficients for the generic algorithm, if the aircraft and the target are currently within the performance envelope of the weapon.

In this way, the coefficients for the generic algorithm are selected if the aircraft and the target are currently within the performance envelope of the weapon, thereby optimising the coefficients for the generic algorithm and hence improving determination of the feasibility of the weapon carried on the aircraft successfully engaging a target and/or the feasibility of a weapon carried on the target successfully engaging the aircraft according to the conditions of the aircraft and the target.

In one example, selecting, by the reconstructor on the aircraft containing the same generic algorithm, the coefficients for the generic algorithm, if the aircraft and the target are within the performance envelope of the weapon, according to the conditions of the aircraft and the target, comprises selecting, by the reconstructor on the aircraft containing the same generic algorithm, the coefficients for the generic algorithm, only if the aircraft and the target are within the performance envelope of the weapon.

In this way, the coefficients for the generic algorithm are selected only if the aircraft and the target are within the performance envelope of the weapon, thereby optimising the coefficients for the generic algorithm and hence improving determination of the feasibility of the weapon carried on the aircraft successfully engaging a target and/or the feasibility of a weapon carried on the target successfully engaging the aircraft according to the conditions of the aircraft and the target.

In one example, selecting, by the reconstructor on the aircraft containing the same generic algorithm, the coefficients for the generic algorithm, if the aircraft and the target are within the performance envelope of the weapon, according to the conditions of the aircraft and the target, comprises selecting, by the reconstructor on the aircraft containing the same generic algorithm, the coefficients for the generic algorithm, while the aircraft and the target are within the performance envelope of the weapon.

In this way, the coefficients for the generic algorithm are selected while the aircraft and the target are within the performance envelope of the weapon, thereby optimising the coefficients for the generic algorithm and hence improving determination of the feasibility of the weapon carried on the aircraft successfully engaging a target and/or the feasibility of a weapon carried on the target successfully engaging the aircraft according to the conditions of the aircraft and the target.

In one example, selecting, by the reconstructor on the aircraft containing the same generic algorithm, the coefficients for the generic algorithm, if the aircraft and the target are within the performance envelope of the weapon, according to the conditions of the aircraft and the target, comprises repeatedly selecting, by the reconstructor on the aircraft containing the same generic algorithm, the coefficients for the generic algorithm, if the aircraft and the target are within the performance envelope of the weapon.

In this way, the coefficients for the generic algorithm are repeatedly, for example periodically (e.g. ms timescale) or intermittently, selected if the aircraft and the target are within the performance envelope of the weapon, thereby repeatedly optimising the coefficients for the generic algorithm and hence improving determination of the feasibility of the weapon carried on the aircraft successfully engaging a target and/or the feasibility of a weapon carried on the target successfully engaging the aircraft according to the conditions of the aircraft and the target.

In one example, selecting, by the reconstructor on the aircraft containing the same generic algorithm, the coefficients for the generic algorithm, if the aircraft and the target are within the performance envelope of the weapon, according to the conditions of the aircraft and the target, comprises deselecting, by the reconstructor on the aircraft containing the same generic algorithm, the coefficients for the generic algorithm, if the aircraft and the target are no longer within the performance envelope of the weapon.

In this way, the feasibility display is not generated by the reconstructor if the aircraft and the target are no longer within the performance envelope of the weapon.

In one example, the types of the candidate polynomials of the set thereof include univariate polynomials, multivariate polynomials and modifications thereof. Other polynomial types are known.

In one example, the orders of the candidate polynomials of the set thereof are in a range from 1 to 100, preferably in a range from 2 to 25, more preferably in a range from 3 to 10, most preferably in a range from 5 to 9, for example 5, 6, 7, 8, 9.

In one example, the generic polynomial is of the form:

$$y_n = \sum_{m=1}^{M_n} \alpha_{mn} x_1^{p_{1mn}} x_2^{p_{2mn}}$$

where:

$\alpha_{mn}$ represent the m coefficients required to compute output n;

$\{x_1 \ldots x_{Ni}\}$ represent the normalised inputs;

$\{y_1 \ldots y_{Ni}\}$ represent the outputs; and $p_{1mn}$ represents the power (exponent) of the $x_1$ variable of the $m^{th}$ term of the $n^{th}$ polynomial.

In one example, the best candidate polynomial is of the form:

$$y = \sum_{n=1}^{M} \alpha_m y_1^{p1m} y_2^{p2m} y_3^{p3m}$$

where:

$$y_1 = \sum_{i=1}^{I} \alpha_i x_1^{p1i} x_2^{p2i} x_3^{p3i}$$

$$y_2 = \sum_{j=1}^{J} \alpha_j x_1^{p1j} x_2^{p2j} x_3^{p3j}$$

$$y_3 = \sum_{k=1}^{J} \alpha_k x_1^{p1k} x_2^{p2k} x_3^{p3k}$$

In one example, the order of the generic polynomial is 3 or greater. In one example, the order of the generic polynomial is in a range from 10 to 25, for example 20. Surprisingly, the inventors have found that using a generic algorithm with an order of around 20 adequately describes most air-to-air engagements accurately in an appropriate runtime for on-aircraft implementation. Nevertheless, the generic algorithm may have an order greater than 2.

In one example, step b) for each candidate polynomial, computing coefficients for that candidate polynomial which best fit that candidate polynomial to the characteristic of the performance envelope of the weapon using the criterion of least square error comprises: 1) generating an initial population of candidate polynomials; 2) for each candidate polynomial, computing a set of coefficients which fit that polynomial to the performance envelope according to one or more criteria; and 3) for each candidate polynomial and respective set of coefficients, computing a score function indicative of the quality of the fit of that candidate polynomial and that set of coefficients to the performance envelope; and 4) recursively applying a genetic algorithm to the set of candidate polynomials until one or more criteria are met, including retaining at least the best scoring polynomial and discarding the other polynomial(s). In one example, the outputs of the retained polynomial(s) are a layer of a Self-Organising Polynomial Neural Network and are used to provide inputs for creating higher order candidate polynomials. In one example, these steps are iterated on the higher order candidate polynomials. In one example, a final result is obtained from the path ending with the best candidate score.

In this way, the method significantly improves weapon integration time and cost. In more detail, typically a genetic algorithm proceeds in an iterative manner by generating new populations of strings from old ones. Every string is the encoded version of a tentative solution. An evaluation function associates a fitness measure to every string indicating its suitability to the problem. The algorithm applies stochastic operators such as selection, crossover and mutation on an initially random population in order to compute a whole generation of new strings. The inventors have identified that these algorithms may be adapted for use on multiple processor workstations or distributed systems with transparent process migration. Every fitness evaluation and adaptation operation may be performed within a separate process i.e. concurrently. In the case of a trivial fitness function, it is likely that not much improvement in the evolution's speed will be observed because of the level of overhead. However, for weapon aiming and many tasks on certain systems, this is obviously time consuming, reflecting the ad hoc nature of the solution process. The accuracy of the fitting depends on the complexity of the performance envelope. To represent the performance envelope accurately and achieve the required accuracy for the whole or a subset of the envelope large data sets may be required. As the data size increase, the amount of computation and the processing time grow faster. The benefits of having the fitness evaluations occur in parallel are significant. According to a second aspect of the present invention, there is provided a system for generating in an aircraft in flight, a feasibility display indicative of a feasibility of a weapon carried on the aircraft successfully engaging a target and/or a feasibility of a weapon carried on the target successfully engaging the aircraft, the computer, the system comprising a first computer, comprising a memory and a processor, remote from the aircraft and a second computer, comprising a memory and a processor, onboard the aircraft;

wherein the first computer is configured to:

provide a database describing a performance envelope of the weapon;

create coefficients characteristic of that performance envelope using a generic algorithm, wherein the generic algorithm has the form of a polynomial, by steps including:

a) generating candidate polynomials, the variables of the polynomials being some or all of a group of weapon or aircraft firing condition parameters;

b) for each candidate polynomial, computing coefficients for that candidate polynomial which best fit that candidate polynomial to a characteristic of the performance envelope of the weapon using a criterion of least square error;

c) for each candidate polynomial, generating a candidate score according to the quality of the fit of that candidate polynomial to the characteristic of the performance envelope of the weapon;

d) applying a genetic algorithm to the candidate polynomials and scores including selecting the best scoring polynomial(s) and discarding the other polynomial(s), thereby identifying a best candidate polynomial and coefficients thereof; and e) repeating said identifying process until all the required characteristics of the performance envelope have corresponding polynomial models;

upload, to the second computer, the coefficients of the identified best candidate polynomial;

wherein the second computer is configured to:

select, by a reconstructor containing the same generic algorithm, the coefficients for the generic algorithm according to conditions of the aircraft and the target; and using the selected coefficients, generate, by the reconstructor, the feasibility display;

characterised by:

wherein step d) applying the genetic algorithm to the candidate polynomials and scores comprises:

i) defining a set of orders and/or types of the candidate polynomials and dividing the defined set of orders and/or types into a plurality of sub-sets thereof;

ii) iteratively applying the genetic algorithm concurrently over the plurality of sub-sets of the defined set of orders and/or types of the candidate polynomials, including iteratively applying the genetic algorithm over the variables of the polynomials for each order and/or type of the respective sub-set thereof and saving the resulting respective coefficients and scores thereof; and iii) selecting the best scoring polynomial(s) using the saved coefficients and scores and discarding the other polynomial(s), thereby identifying the best candidate polynomial and coefficients thereof; and wherein the second computer is configured to select, by the reconstructor containing the same generic algorithm, the coefficients for the generic algorithm according to conditions of the aircraft and the target, if the aircraft and the target are within the performance envelope of the weapon, according to the conditions of the aircraft and the target.

In one example, the system comprises a display for displaying the feasibility display.

According to a third aspect of the present invention, there is provided an aircraft comprising the second computer according to the second aspect.

According to a fourth aspect of the present invention, there is provided a computer, comprising a processor and a memory, configured to implement a method according to the first aspect.

According to a fifth aspect of the present invention, there is provided a computer program comprising instructions which, when executed by a computer, comprising a processor and a memory, cause the computer to perform a method according to the first aspect.

According to a sixth aspect of the present invention, there is provided a non-transient computer-readable storage medium comprising instructions which, when executed by a computer, comprising a processor and a memory, cause the computer to perform a method according to the first aspect.

BRIEF DESCRIPTION OF THE FIGURES

Embodiments of the invention will now be described by way of example only with reference to the figures, in which.

DETAILED DESCRIPTION

Figure 1A:
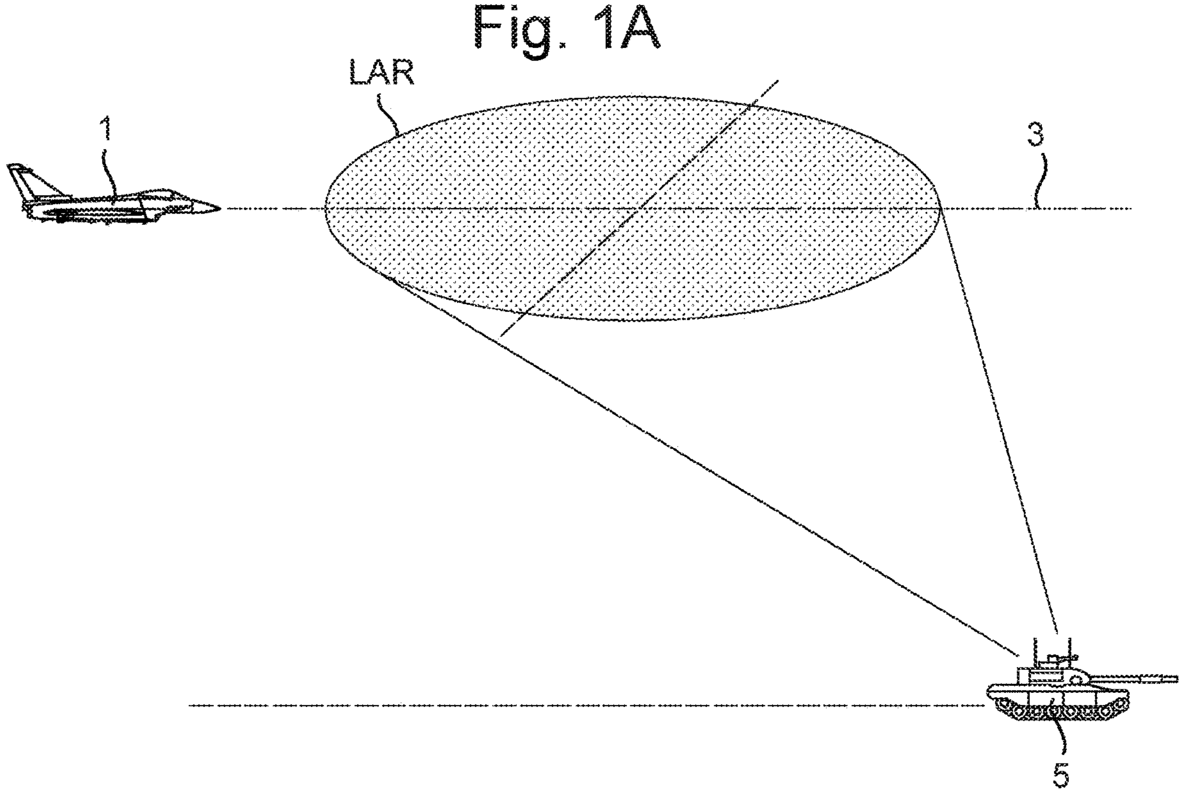
FIGS. 1A and 1B schematically depict a Launch Acceptability Region (LAR) for an air-to-surface weapon.
Figure 1B:
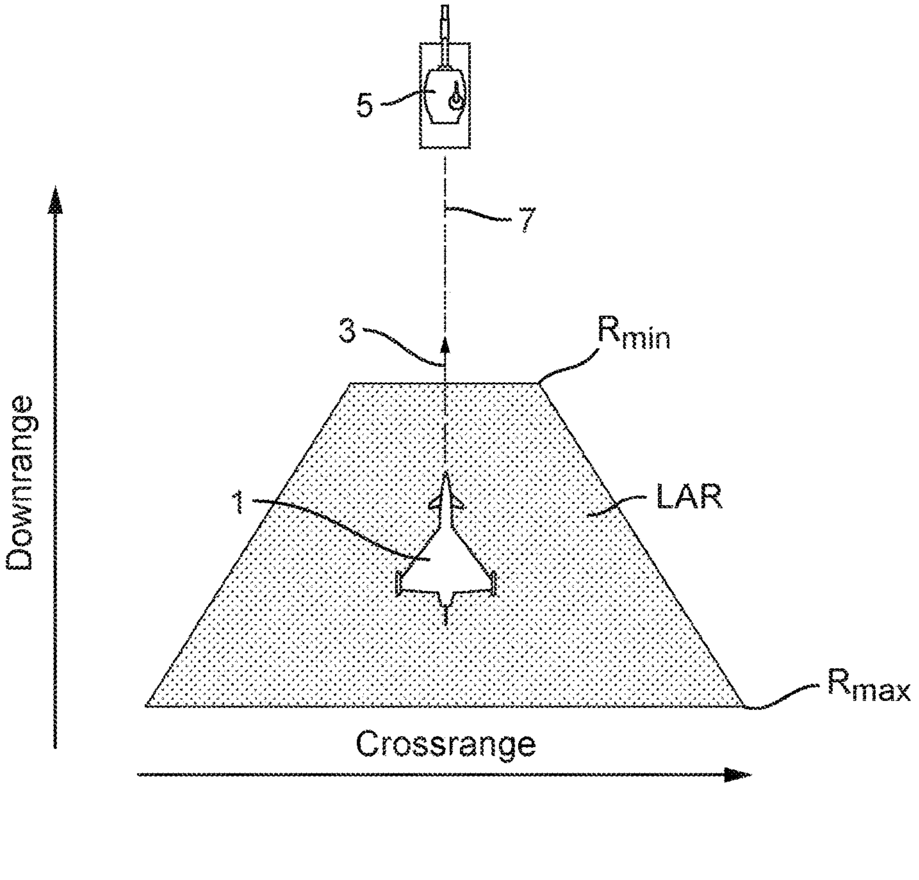

FIG. 1A schematically depicts the LAR in the plane of flight of a launch aircraft 1 flying along a flight path 3 in respect of a target 5 for an air-to-surface weapon (not shown) loaded on the aircraft. The LAR is calculated to provide cockpit displays in the launch aircraft 1 concerning the feasibility and firing opportunities for the situation. FIG. 1B schematically depicts the display generated for the LAR of FIG. 1A, which is in the form of a down range and cross range display (shaded area), where the weapon flight path 7 coincides with the aircraft flight path 3; to successfully engage the target 5 as shown in the display, the target must fall inside the shaded LAR. As the aircraft 1 moves in the downrange direction, the displayed LAR is bounded by the minimum and maximum ranges, $R_{min}$ and $R_{max}$.

In addition to the LAR for the launch aircraft 1, a Missile Engagement Zone (MEZ) for the target 5 may be determined and displayed to the pilot of the aircraft 1. This MEZ may indicate a region in which the likelihood of a ground-to-air weapon (e.g. a missile) carried by the target 5 successfully intercepting the aircraft 1 is above a threshold value.

Figure 2:
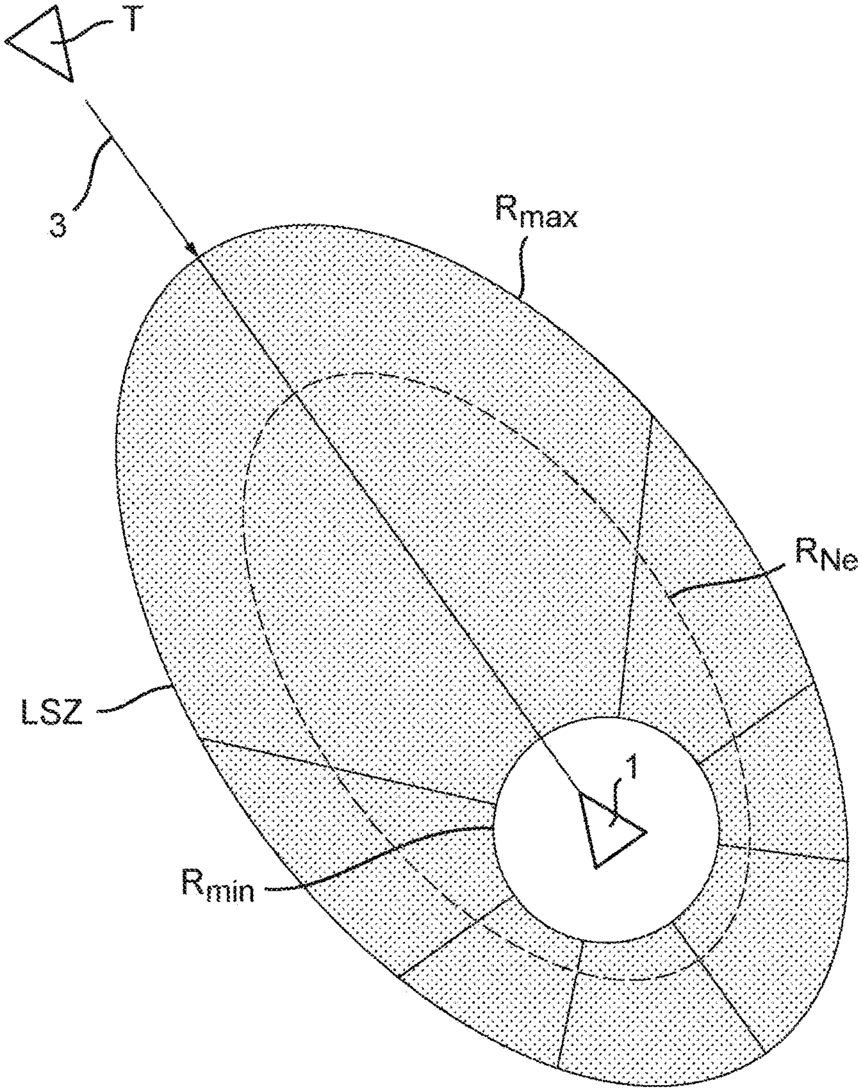
FIG. 2 schematically depicts a Launch Success Zone (LSZ) for an air-to-air weapon.

The LSZ shown in FIG. 2 is the region where the probability of an air-to-air weapon hitting an airborne target T is above a threshold level. Calculation of the LSZ is more complicated than for the LAR, because a greater number of factors are involved, such as the relative velocities and directions of travel of the launch aircraft and the target, and those of the weapon relative to the target. Also, the shape of the LSZ is more complex than that of the LAR; as with the LAR, there are maximum and minimum ranges, $R_{min}$ and $R_{max}$, between which the target T can be successfully engaged, but there is a zone bounded by $R_{min}$ within which the target T cannot be engaged successfully because it is outside the capability of the weapon to manoeuvre and hit the target when the launch aircraft is so close to the target, given the speeds and directions of travel of the launch aircraft and the target T. In this example, the LSZ further includes a so-called "no escape range" $R_{NE}$. The zone bounded by $R_{NE}$ and $R_{min}$ is a zone in which the likelihood of the Target T successfully evading the weapon is below a threshold likelihood. This range may be determined using performance parameters of the weapon, the launch aircraft 1 and the target T. As is known in the art, there are two LSZs, one for the launch aircraft to engage the target 7 and the other for the target to engage the launch aircraft.

It is often a requirement to calculate the LAR or LSZ for an engagement to display to the crew of the launch aircraft information regarding the feasibility, or likelihood of success, of the engagement, and to aid fire control and steering decisions. The traditional approach has been to create a simple, abstract model of the weapon that has parameters defined by the launch conditions; this model is then used on board the launch aircraft to generate the LAR, LSZ, or MEZ and the appropriate display.

Traditional Weapon Aiming Process usually involve bespoke design, implementation and qualification for every weapon/platform combination. Bespoke approach is extremely costly and time intensive. Even minor changes in weapon performance trigger complex loops around the bespoke process. Such process was also subject to limited on board computational capacity. However, todays platforms have passed the critical capacity limit. In order to improve weapon integration time and affordability, the inventors have developed a Data Driven Weapon Integration (DDWI) approach that uses a generic algorithm, which can be "customised" for a particular weapon by using a unique set of data coefficients. In doing so, DDWI breaks the dependency on the bespoke model for weapon aiming creation. It reduces avionics life cycle cost and improves timescales delivering a significant saving, and offers flexibility in service to "tune"

and/or "sanitise" weapon aiming performance. The mission data coefficients uploaded onto the platform are derived from a sophisticated multi-dimensional weapon model. Performing parallel computations on multicore computers, GPUs, and computer clusters let the inventors solve such computationally and data-intensive problems, unlock more performance and reduction in processing time.

Figure 3:
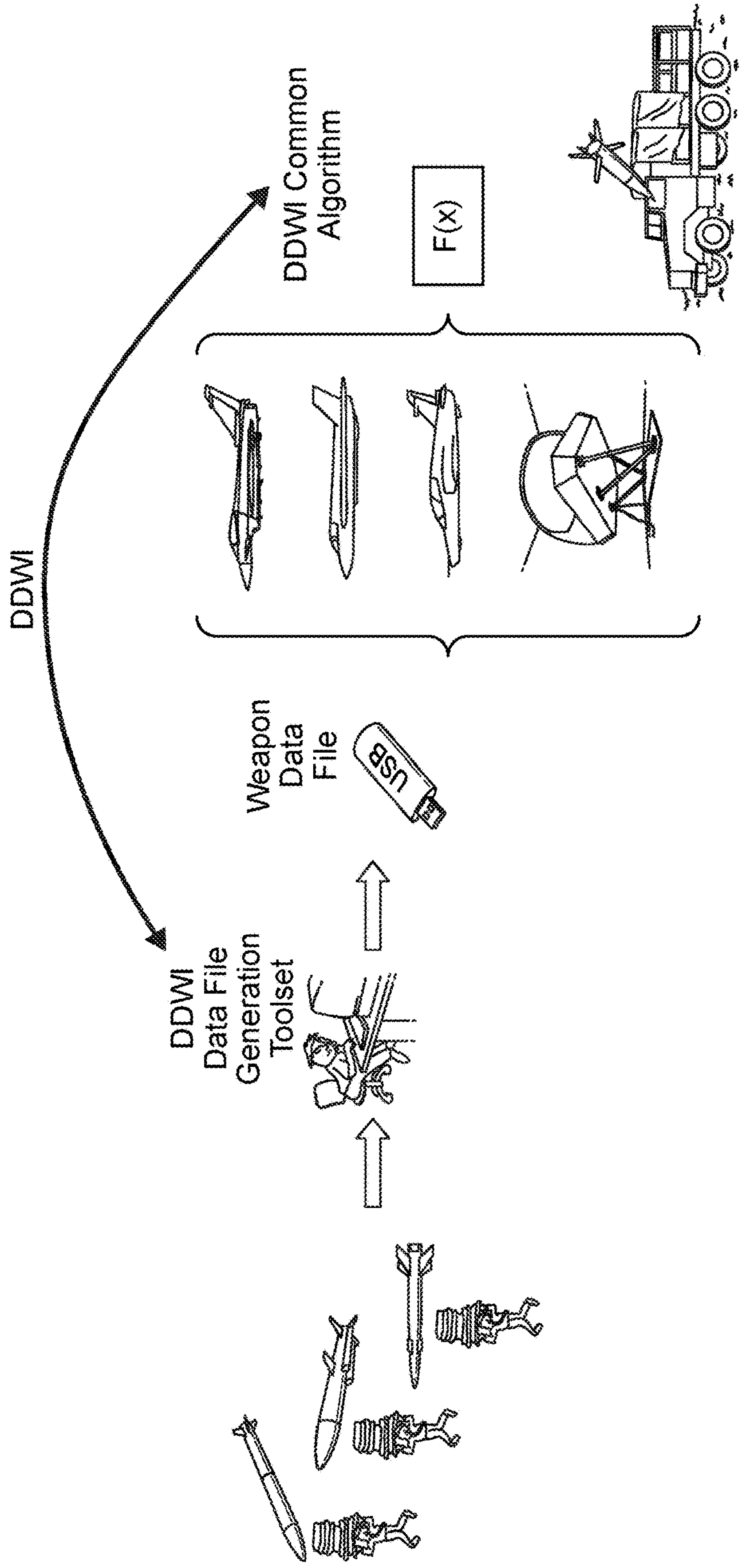
FIG. 3 schematically depicts a system according to an exemplary embodiment.

FIG. 3 schematically depicts a system according to an exemplary embodiment. The DDWI has three elements:

Fitting Toolset, an office based design tool for Mission Systems engineers to turn weapon truth data into a set of weapon coefficients;

Data loaded coefficients, a common format that can be software build/theatre/mission data loaded into different platforms for the same weapon; and Common on board algorithm, which can represent any weapon on any platform and only becomes weaponised when coefficients are loaded.

Figure 4:
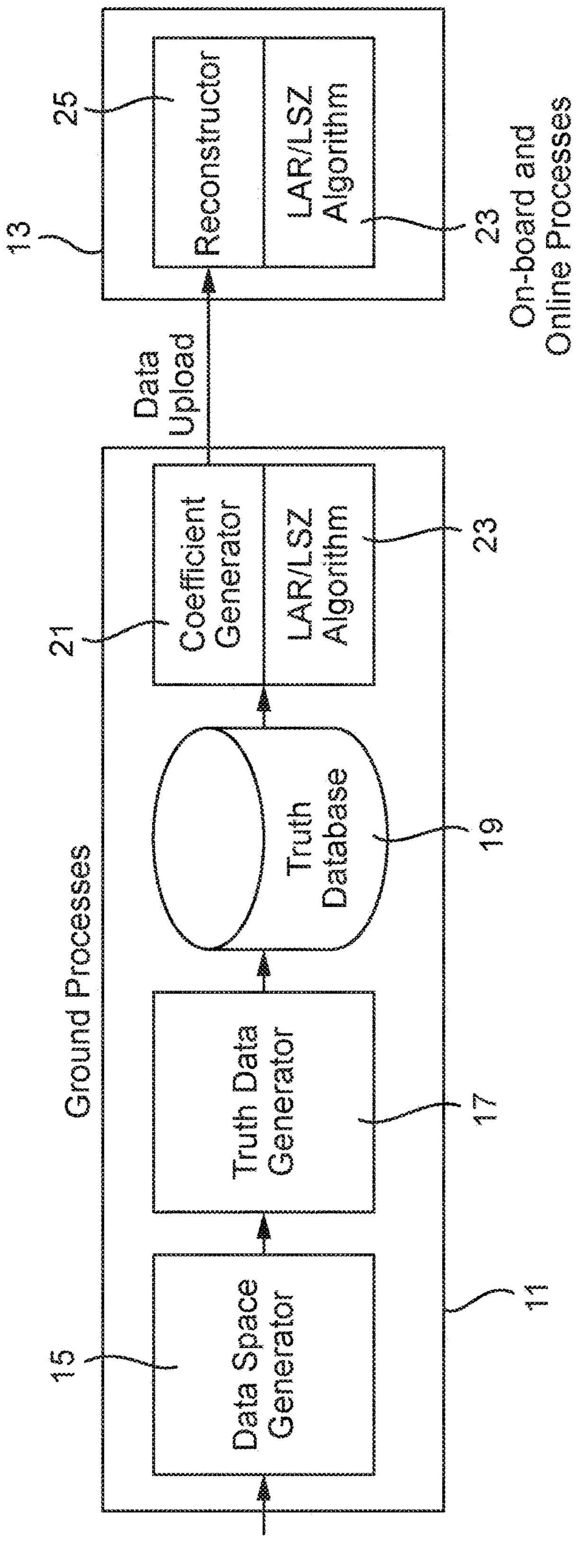
FIG. 4 schematically depicts the system of FIG. 3, in more detail.

FIG. 4 schematically depicts the system of FIG. 3, in more detail, and is divided between those processes 11 which are carried out on the ground and the processes 13 which are carried out on the launch aircraft 1. The system is for generating in an aircraft in flight, a feasibility display indicative of a feasibility of a weapon carried on the aircraft successfully engaging a target and/or a feasibility of a weapon carried on the target successfully engaging the aircraft, the computer, the system comprising a first computer, comprising a memory and a processor, remote from the aircraft and a second computer, comprising a memory and a processor, onboard the aircraft.

The first computer 11 is configured to: provide a database describing a performance envelope of the weapon; create coefficients characteristic of that performance envelope using a generic algorithm, wherein the generic algorithm has the form of a polynomial, by steps including: a) generating candidate polynomials, the variables of the polynomials being some or all of a group of weapon or aircraft firing condition parameters; b) for each candidate polynomial, computing coefficients for that candidate polynomial which best fit that candidate polynomial to a characteristic of the performance envelope of the weapon using a criterion of least square error; c) for each candidate polynomial, generating a candidate score according to the quality of the fit of that candidate polynomial to the characteristic of the performance envelope of the weapon; d) applying a genetic algorithm to the candidate polynomials and scores including selecting the best scoring polynomial(s) and discarding the other polynomial(s), thereby identifying a best candidate polynomial and coefficients thereof; and e) repeating said identifying process until all the required characteristics of the performance envelope have corresponding polynomial models; upload, to the second computer, the coefficients of the identified best candidate polynomial. Step d) applying the genetic algorithm to the candidate polynomials and scores comprises: i) defining a set of orders and/or types of the candidate polynomials and dividing the defined set of orders and/or types into a plurality of sub-sets thereof; ii) iteratively applying the genetic algorithm concurrently over the plurality of sub-sets of the defined set of orders and/or types of the candidate polynomials, including iteratively applying the genetic algorithm over the variables of the polynomials for each order and/or type of the respective sub-set thereof and saving the resulting respective coefficients and scores thereof; and iii) selecting the best scoring polynomial(s) using the saved coefficients and scores and discarding the other polynomial(s), thereby identifying the best candidate polynomial and coefficients thereof.

In more detail, the core of the DDWI is the off-line coefficient generator 21. The coefficient generator 21 identifies coefficients for the generic algorithm to make it 'fit' the performance envelope shape. The form of the generic algorithm is usually decided in advance e.g. any polynomial equation of degree (i.e. order) up to n. The coefficient generator 21 receives the true performance envelope and calculates coefficients for the generic algorithm. The coefficients 'fit' the generic algorithm to the performance envelope shape.

The estimation and fitting process uses a Genetic Algorithm for self-organising polynomial neural network approach. It calculates the sets of coefficients that would allow the geometric shapes of LAR/LSZ regions to be modelled (and subsequently reconstructed) by standard polynomial "algorithms", see FIG. 5. It uses an evolutionary technique called Genetic Algorithm as the central mechanism for Self-Organising Polynomial Neural Network (GA-SOPNN), and automating the derivation of a number of polynomial model's coefficients within each layer. The process involves the following steps:

1. Create an initial population of candidate polynomials, of different order with inputs comprising some or all of the firing parameters, in which each polynomial function is a unique solution to the problem;
2. Compute coefficients to fit these candidates to the weapon performance envelope for the chosen characteristic of the LAR/LSZ; using the criterion of least-squares error;
3. Compute a score function for each candidate;
4. Improve this population recursively using a Genetic Algorithm:

a) Retain the best scoring candidates;
b) Reject the worst candidates;
c) "Breed" a new population with randomly chosen combinations of characteristics drawn from the best group;

5. Iterate until it stops improving or it meets your accuracy criteria;
6. The result is the first layer of a Self-Organising Polynomial Neural Network (SOPNN);
7. Each subsequent layer of the SOPNN takes the best outputs of the previous layer as its inputs, and then proceeds as described above;
8. The effect is to create higher-order candidate polynomials for consideration;
9. Optimisation within the new layer uses the same Genetic Algorithm as before;
10. Layers are added until improvement stops or reaches the maximum layer as set by the user;
11. Only the single best polynomial and coefficient set of interest—i.e. the output of the final layer with the best score;
12. All other outputs of the final layer are rejected;
13. All nodes in the lower layers that do not contribute to the best polynomial are rejected.

Figure 6:
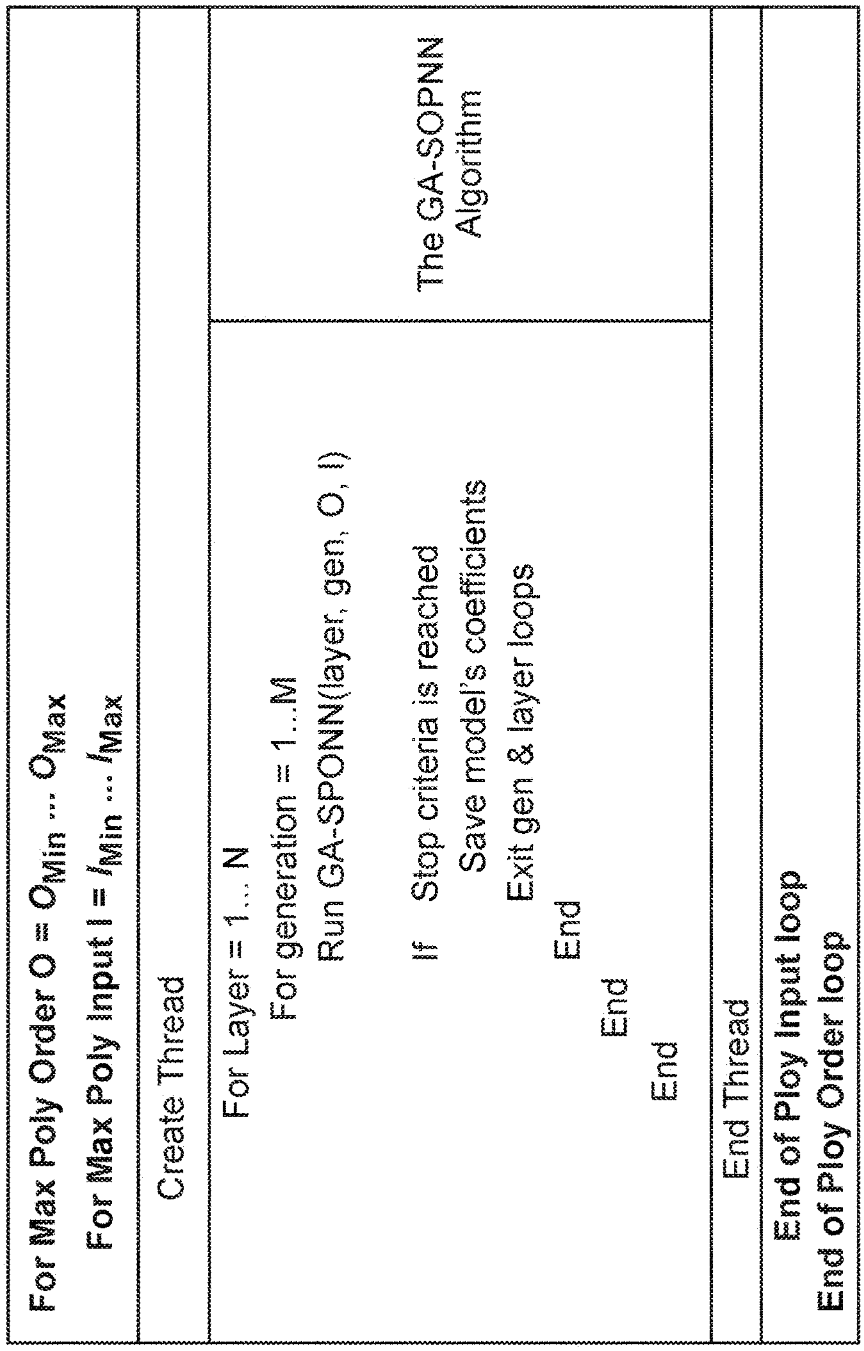
FIG. 6 schematically depicts the system of FIG. 3, in more detail, showing GA-SOPNN parallelisation over the many polynomial order and input parameters.

In order to apply genetic algorithms to a particular application, an internal representation of the space to be searched is selected and an external function that assigns a fitness value to candidate solutions is defined. The inventors have adapted the genetic algorithm to parallelise over the many polynomial orders and input parameters that the genetic algorithm has to run, as shown in FIG. 6. Each run tests several parameter combinations of polynomial order and inputs, reporting on the execution time, memory and flops operations for the final model requirement to solve the problem for each parameter combination, as described below in more detail.

In this example, the polynomial is parameterized into a string of binary string comprising three parameters (also known as sub-chromosones):

$1^{st}$ parameter is order;

$2^{nd}$ parameter is number of inputs; and $3^{rd}$ parameter identifies which inputs are used by that polynomial.

In this example, iteratively applying the genetic algorithm over the variables of the polynomials for each order and/or type of the respective sub-set thereof comprises:

selecting combinations of the variables of the polynomials for each order and/or type of the respective sub-set thereof; and iteratively applying the genetic algorithm over the selected combinations of the variables of the polynomials for each order and/or type of the respective sub-set thereof.

In this example, the genetic algorithm starts with an initial population of randomly generated strings and hence a corresponding initial population of randomly generated polynomials (orders, inputs). Each polynomial is scored using a least squares fit and the best polynomials are selected. These best polynomials are mutated by switching the binary in the corresponding strings to modify (orders, inputs). The modified strings are used to generate new polynomials in a new layer of the SOPNN. The order of the polynomial increases from layer to another.

In this example, iteratively applying the genetic algorithm over the selected combinations of the variables of the polynomials for each order and/or type of the respective sub-set thereof comprises iteratively applying the genetic algorithm concurrently over the selected combinations of the variables of the polynomials for each order and/or type of the respective sub-set thereof.

In this example, iteratively applying the genetic algorithm concurrently over the plurality of sub-sets of the defined set of orders and/or types of the candidate polynomials comprises iteratively applying the genetic algorithm concurrently over the plurality of sub-sets of the defined set of orders and/or types of the candidate polynomials on respective processors and/or different threads.

In this example, iteratively applying the genetic algorithm concurrently over the selected combinations of the variables of the polynomials for each order and/or type of the respective sub-set thereof comprises iteratively applying the genetic algorithm concurrently over the selected combinations of the variables of the polynomials for each order and/or type of the respective sub-set thereof on respective threads and/or processors.

In this example, the maximum polynomial order is capped and the maximum number inputs is capped. Capping the maximum order and number of inputs means that the randomly generated polynomials during the GA training can be of any order and inputs up to their maximum values respectively. In this example, the respective coefficients for each polynomial order are computed by individual processors. In this example, the respective coefficients for each input for each polynomial order are computed by individual processors.

Figure 7:
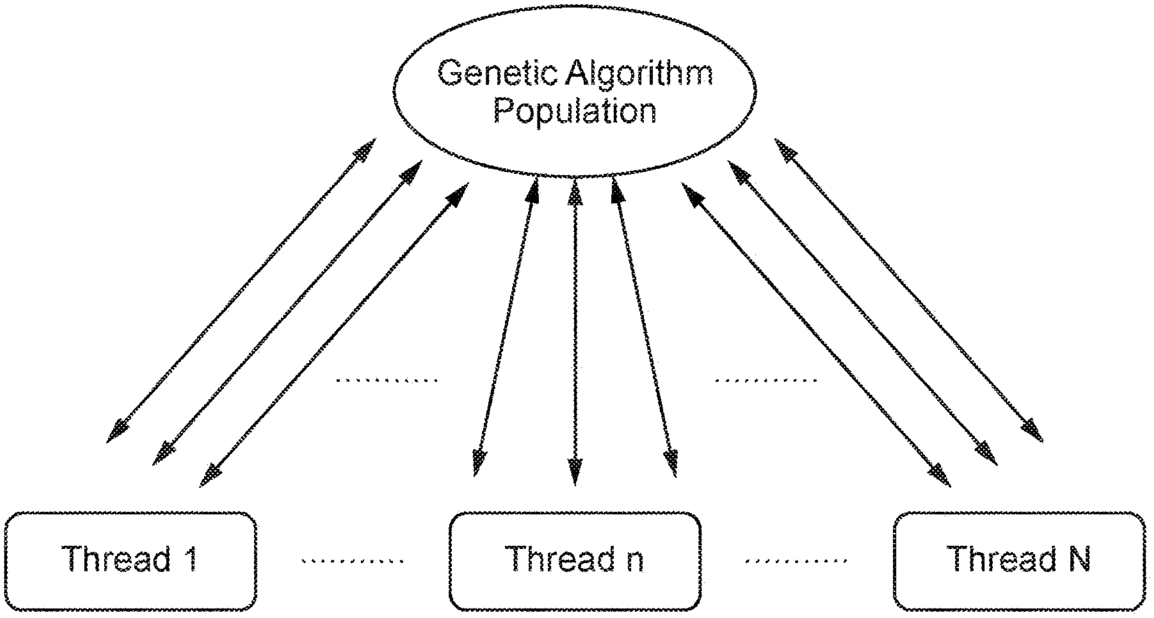
FIG. 7 schematically depicts the system of FIG. 3, in more detail.

Parallelising the operation of the GA-SOPNN itself will/allow us to unlock more performance, as shown in FIG. 7. By allocating NUM_THREADS for each process, individual solution in the population can be divided between threads. For example, for a GA population of 100 individuals, and 4 CPU cores, the 100 iterations would be divided into 4 so thread 0 would do 1-25, thread 1 26-50 and so on, which result in the GA-SOPNN algorithm do the work about 4 times faster.

In more detail, the processes 11, 13 begin with the generation of the data space, which is the range of conditions over which the weapon performance envelope is to be defined; this is effected by a data space generator 15, and depends on the ranges of conditions: for which it is required to fire the weapon (which is defined by the weapon user/operator); for which it is feasible to fire according to the launch aircraft capability, and for which it is feasible to fire according to the weapon capability/performance.

In this example, the data space generator 15 comprises data which describes performance parameters for each of a plurality of different aircraft types. Different types of aircraft may have different capabilities from one another, thus, for example, aircraft having the same or similar capabilities may be regarded as being the same "aircraft type". Different types of aircraft may be different models or makes of aircraft and/or may have different manufacturers. Different types of aircraft may have different operational parameters (maximum speed, maximum altitude, g limit, etc.). Different types of aircraft may be configured for different purposes or function (e.g. bombers, fighters, re-fueling etc.). These aircraft performance envelopes may be supplied by the aircraft manufacturers or through testing. The plurality of different aircraft types includes the type of the launch aircraft 1 and, preferably, the target aircraft T. The performance parameters for each of the aircraft types may include, but are not limited to, a maximum achievable altitude, a maximum achievable g-force, and a maximum achievable climb angle. The values of the performance parameters for different types of aircraft may be different from one another. For example, a first type of aircraft may have a maximum altitude of 45,000 ft whereas a second type of aircraft may have a maximum altitude of 55,000 ft, and so on.

In this example, the data space generator 15 further comprises data which describes performance parameters for each of a plurality of different weapon types, e.g. different weapons that may be loaded onto to the launch aircraft or may be expected to be carried by a hostile target. These weapon performance envelopes may be supplied by the weapon manufacturers or through testing. The plurality of different weapon types includes the type of the weapon that is carried by the launch aircraft 1 and, preferably, the target. The performance parameters for each of the weapon types may include, but are not limited to, a maximum altitude at which the weapon may be released, a maximum g-force at which the weapon may be released, and release mechanism of the weapon. The values of the performance parameters for different types of weapon may be different from one another. For example, a first type of weapon may be able to be released up to an altitude of 35,000 ft, whereas a second type of weapon may be able to be released up to an altitude of 45,000 ft, and so on.

The data space generator 15 may define the release, weather and commanded impact conditions for training and verification sets which are run by a truth data generator 17.

The truth data generator 17 determines the weapon performance for each firing case in the data space; this depends on the weapon performance model which is usually provided by the weapon manufacturer.

The product of the truth data generator 17 is the truth database 19, which is a set of data specifying, for each weapon type, the further weapon performance envelope for each of a plurality of exemplary weapon firings. The truth data generator 17 may produce the training and verification sets which are used by a coefficient generator 21.

Conventionally, the truth database is used as a model which can be employed onboard the launch aircraft in order to generate the feasibility of engagement displays (LAR or LSZ, as appropriate).

In this example, the coefficient generator 21 receives the further weapon performance envelopes stored by the truth database 19 and calculates, for each weapon type and for each example weapon firing, coefficients according to a generic LAR/LSZ algorithm 23 that "fit" the generic algorithm to the further weapon performance envelope shape.

What will now be described is a method of determining coefficient values that fit a generic algorithm to the performance envelope of a particular weapon type and particular example weapon firing. It will be appreciated that in reality, a set of coefficients is determined for each of the weapon types for each of the example weapon firings.

In this method the coefficient generator 21 starts by creating an initial set of candidate polynomials whose variables are some or all of the weapon or aircraft firing condition parameters. Each of the candidate polynomials is a unique solution the fitting problem. Some or all of the candidate polynomials may have different order, or dimension, from some or all of the other candidate polynomials. For each candidate polynomial, a set of coefficients is then computed that best "fit" that candidate polynomial to the weapon performance envelope. This may be done using a criterion of least square error or any other fitting method. For each candidate polynomial, a score indicative of the quality of this fit is then computed.

The number of inputs 27 and the form of each polynomial descriptor, PD Layer Node, are determined by an optimisation method known as the Genetic Algorithm. The Genetic Algorithm is applied to the candidate polynomials and scores. In this example, the best scoring polynomials are retained and the other (i.e. worst scoring) polynomials are rejected. New candidate polynomials that have similar features to the retained candidate polynomials are then created to replace the rejected ones (e.g. by 'breeding' and 'mutating' the retained candidate polynomials). A set of coefficients and score values are then calculated for this new generation of candidates, and so on.

The Genetic Algorithm is repeated until improvement in the scores of the best candidates ceases or some other criteria are satisfied. The result is the first layer, Layer 1, of a Self-Organising Polynomial Neural Network (SOPNN).

The whole process is then repeated with the outputs of the first layer providing the inputs to create a second layer, Layer 2, of the SOPNN. The new layer has the effect of creating higher-order candidate polynomials and coefficients for consideration. The selection of polynomials in the new layer is again governed and optimised by the Genetic Algorithm.

Figure 5:
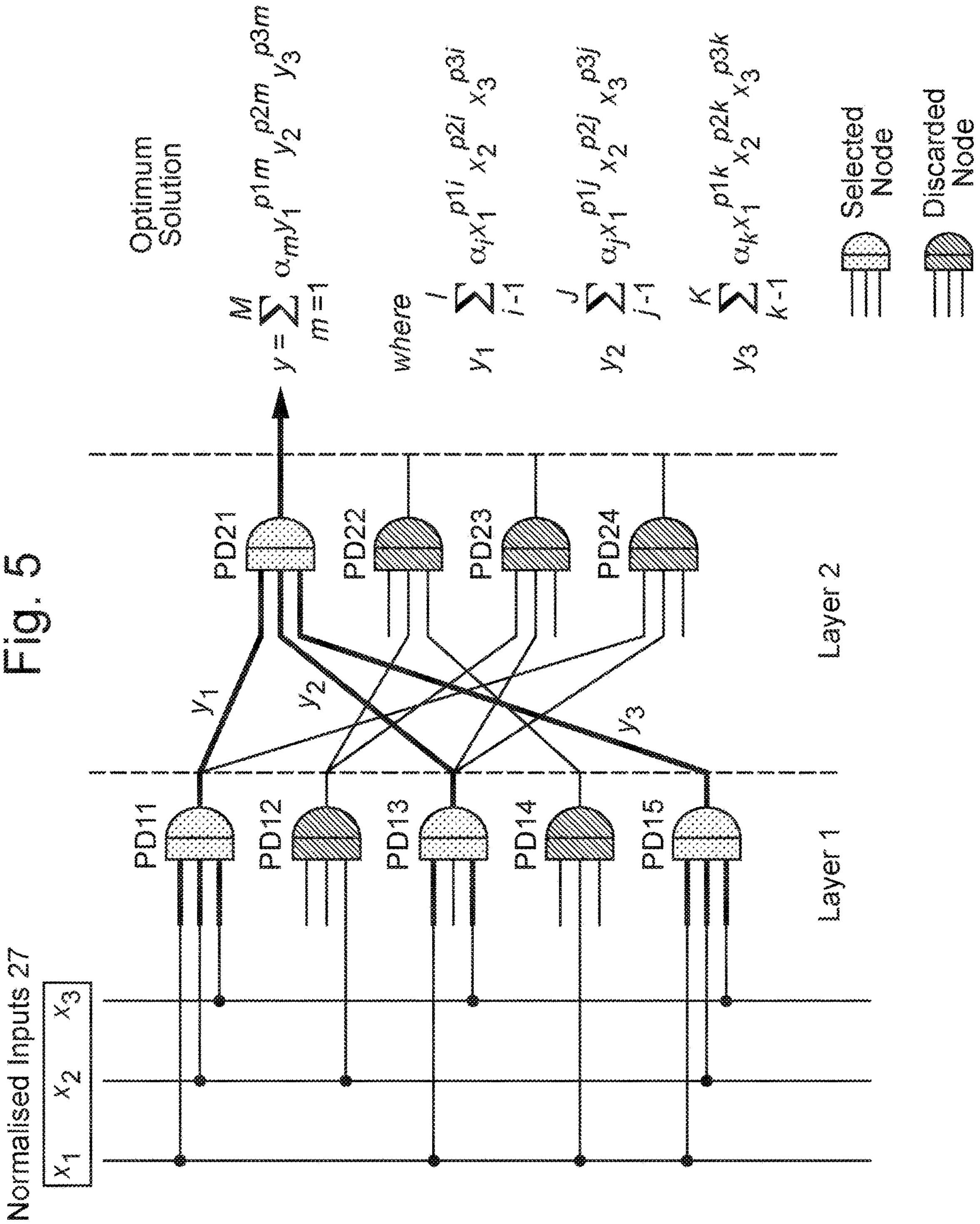
FIG. 5 schematically depicts the system of FIG. 3, in more detail, showing construction of the SOPNN.

Layers are added to the SOPNN in this way until improvement in the scores of the best candidates ceases or some other criteria are satisfied. A completed network comprising two layers is represented in FIG. 5. The final network is obtained recursively from the path ending at the output node with the best score in the final generation of candidates (the "Optimum Solution"). Any node with no connection to this path is discarded as shown in FIG. 5, where nodes which contribute to the optimal solution are lightly shaded and discarded nodes are black.

As described above, the inventors have adapted the genetic algorithm to parallelise over the many polynomial orders and input parameters that the genetic algorithm has to run.

The best single candidate polynomial and coefficient set is identified and stored. This process is repeated until all the required characteristics of the LAR/LSZ have corresponding polynomial models. In other words, the process is repeated until, for each firing condition, and for each weapon type, a polynomial model fitted to the further weapon performance envelope for that weapon type and firing condition is generated.

The generic LAR/LSZ algorithm is predetermined, and in this example, the generic polynomial is, as described previously, of the form:

$$y_n = \sum_{m=1}^{M_n} \alpha_{mn} x_1^{p_{1mn}} x_2^{p_{2mn}}$$

In this example, the best candidate polynomial is, as described previously, of the form:

$$y = \sum_{n=1}^{M} \alpha_m y_1^{p_{1m}} y_2^{p_{2m}} y_3^{p_{3m}}$$

In this example, the order of the generic polynomial is in a range from 10 to 25, for example 20.

Referring again to FIG. 4, the output of the coefficient generator 21 is the set of coefficients which is loaded onto the launch aircraft by a data uploader. Following this step, the onboard processes 13 comprise a reconstructor 25, which brings together the generic LAR/LSZ algorithm 23 (which is held in the aircraft systems) and the uploaded coefficients, so as to reconstruct the LAR, LSZ, or MEZ for a particular engagement by selecting the appropriate algorithm and coefficients for the current launch conditions (i.e. the weapon or aircraft firing conditions).

Once the LAR, LSZ, or MEZ has been reconstructed for a particular engagement by the systems onboard the aircraft, the LAR, LSZ, or MEZ is displayed by conventional means onboard the aircraft. In this example, in operation, when the launch aircraft 1 engages with a hostile target aircraft T, the reconstructor 25 onboard the launch aircraft 1 may select, from the uploaded coefficients, those coefficients that correspond to the weapon being carried by the launch aircraft 1 and that correspond to the relevant firing condition (altitude, angle of attack, environmental conditions, g-force being experienced etc.). The selected coefficients may then be used to reconstruct the LSZ of the launch aircraft 1 for display to the pilot of the launch aircraft 1. The reconstructed LSZ of the launch aircraft 1 may also be used by other systems onboard the launch aircraft 1 to recommend actions to the pilot of the launch aircraft 1 (e.g. a recommendation that the weapon is fired etc.).

When the launch aircraft 1 engages with a hostile target aircraft T, the aircraft type of the hostile target T may be determined by the pilot of the launch aircraft 1 (or by other means) and input to the reconstructor 25. The reconstructor 25 onboard the launch aircraft 1 may then select, from the uploaded coefficients, those coefficients that correspond to the weapon most likely being carried by the hostile target T and that correspond to the relevant firing conditions. The selected coefficients may then be used to reconstruct the LSZ of the hostile target T for display to the pilot of the launch aircraft 1. The reconstructed LSZ of the hostile target T may also be used by other systems onboard the launch aircraft 1 to recommend actions to the pilot of the launch aircraft 1 (e.g. a recommendation that certain evasive manoeuvres are performed etc.).

In this example, in operation, when the launch aircraft 1 engages with a hostile ground target 5, the reconstructor 25 on-board the launch aircraft 1 may select, from the uploaded coefficients, those coefficients that correspond to the weapon being carried by the launch aircraft 1 and that correspond to the relevant firing condition (altitude, angle of attack, environmental conditions, g-force being experienced etc.). The selected coefficients may then be used to reconstruct the LAR of the launch aircraft 1 for display to the pilot of the launch aircraft 1. The reconstructed LAR of the launch aircraft 1 may also be used by other systems onboard the launch aircraft 1 to recommend actions to the pilot of the launch aircraft 1 (e.g. a recommendation that the weapon is fired etc.).

When the launch aircraft 1 engages with a hostile ground target 5, the type of the ground target 5 may be determined by the pilot of the launch aircraft 1 (or by other means) and input to the reconstructor 25. The reconstructor 25 onboard the launch aircraft 1 may then select, from the uploaded coefficients, those coefficients that correspond to the weapon most likely being carried by the ground target 5 and that correspond to the relevant firing conditions. The selected coefficients may then be used to reconstruct the MEZ of the ground target 5 for display to the pilot of the launch aircraft 1. The reconstructed MEZ of the ground target 5 may also be used by other systems onboard the launch aircraft 1 to recommend actions to the pilot of the launch aircraft 1 (e.g. a recommendation that certain evasive manoeuvres are performed etc.).

The second computer 13 is configured to: select, by a reconstructor containing the same generic algorithm, the coefficients for the generic algorithm according to conditions of the aircraft and the target; and using the selected coefficients, generate, by the reconstructor, the feasibility display. The second computer 13 is configured to select, by the reconstructor containing the same generic algorithm, the coefficients for the generic algorithm according to conditions of the aircraft and the target, if the aircraft and the target are within the performance envelope of the weapon, according to the conditions of the aircraft and the target.

In this way, a Capability Filter (CF) is provided that finds the limits of the capable envelope of a weapon system in any chosen region of the engagement envelope and examines the feasibility of weapon engagement for current launch conditions—i.e. for finding out if the current firing is inside or outside the "hit zone" for the weapon. This offers the prospect of classifying large, highly dimensional spaces using relatively concise models, thus saving in both processing and storage for the host system.

Figure 8:
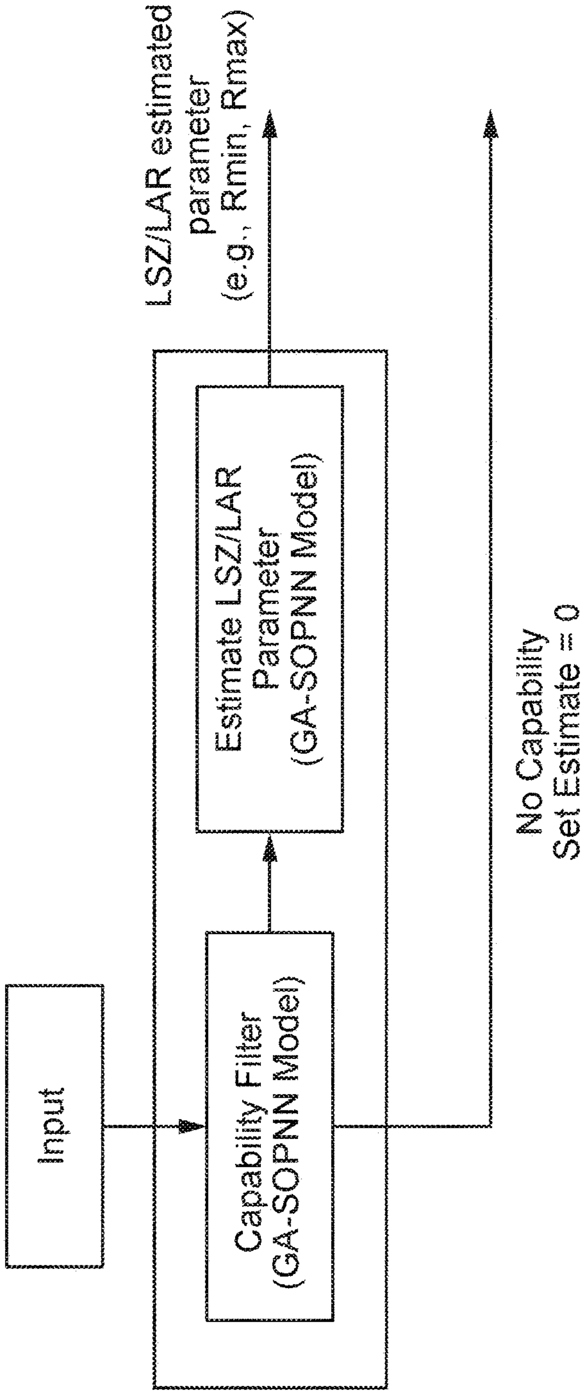
FIG. 8 schematically depicts the system of FIG. 3, in more detail, showing GA-SOPNN models application for classifying weapon capability and for LSZ/LAR parameters estimation in the region of the engagement.

FIG. 8 shows how the capability filter fits in the assessment of the whole envelope. The diagram represents the process carried out for a candidate engagement. Firstly, the capability filter assesses whether or not the weapon has capability. Secondly, if the weapon has capability, the relevant LSZ/LAR parameters are then estimated.

Figure 9:
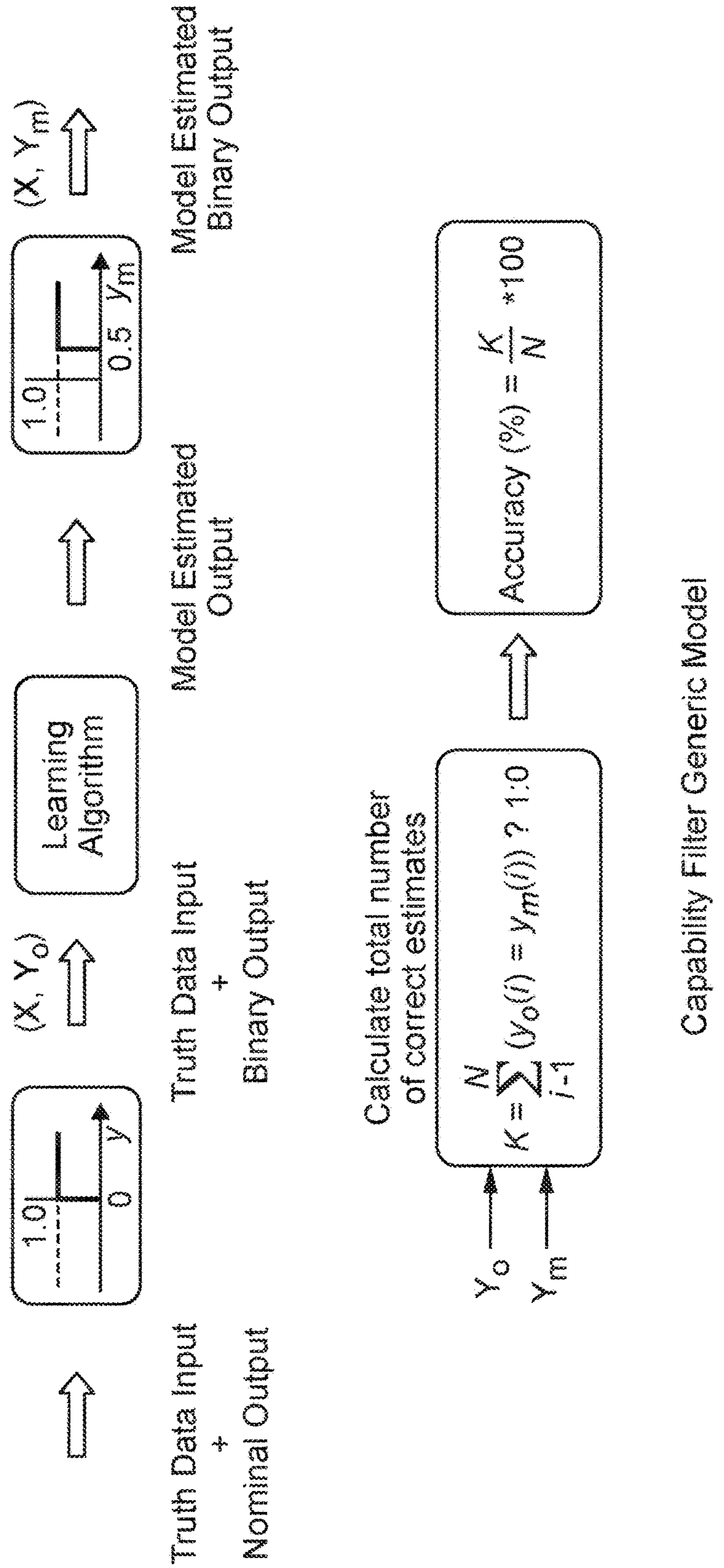
FIG. 9 schematically depicts the system of FIG. 3, in more detail, showing a Polynomial Neural Network Based Capability Filter.

FIG. 9 outlines the three main steps involved in the CF implementation. First, all capability ranges in the training data are converted to one and the no capability cases are kept as zero, then the fitting and estimation method described above is used to numerically learn the binary outputs, and finally a threshold is applied to the predicted values, (somewhere between 1 and 0), to determine the true binary output.

Apparatus, including the any of the above mentioned processors, for implementing the above described arrangement, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. A computer-implemented method of generating, in an aircraft in flight, a feasibility display indicative of a feasibility of a weapon carried on the aircraft successfully engaging a target and/or a feasibility of a weapon carried on the target successfully engaging the aircraft, the method comprising:

providing a database describing a performance envelope of the weapon;

creating coefficients characteristic of that performance envelope using a generic algorithm, wherein the generic algorithm has a form of a polynomial, the creating including:

a) generating candidate polynomials, variables of the candidate polynomials being some or all of a group of weapon or aircraft firing condition parameters;

b) for each candidate polynomial, computing coefficients for that candidate polynomial which best fit that candidate polynomial to a characteristic of the performance envelope of the weapon using a criterion of least square error;

c) for each candidate polynomial, generating a candidate score according to a quality of the fit of that candidate polynomial to the characteristic of the performance envelope of the weapon;

d) applying a genetic algorithm to the candidate polynomials and scores including selecting the best scoring candidate polynomial and discarding the other candidate polynomials, thereby identifying a best candidate polynomial and coefficients thereof; and e) repeating said identifying process until each of the characteristics of the performance envelope have corresponding polynomial models;

uploading, to the aircraft, the coefficients of the identified best candidate polynomial;

selecting, by a reconstructor on the aircraft containing the same generic algorithm, coefficients for the generic algorithm according to conditions of the aircraft and the target; and using the selected coefficients, generating, by the reconstructor, the feasibility display;

wherein step d) applying the genetic algorithm to the candidate polynomials and scores comprises:

i) defining a set of orders and/or types of the candidate polynomials and dividing the defined set of orders and/or types into a plurality of sub-sets thereof;

ii) iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof; and iii) selecting the best scoring candidate polynomial using the saved coefficients and scores and discarding the other candidate polynomials, thereby identifying the best candidate polynomial and coefficients thereof, wherein the selecting, by the reconstructor on the aircraft containing the same generic algorithm, the coefficients for the generic algorithm according to conditions of the aircraft and the target comprises selecting, by the reconstructor on the aircraft containing the same generic algorithm, the coefficients for the generic algorithm, if the aircraft and the target are within the performance envelope of the weapon, according to the conditions of the aircraft and the target, and wherein the iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof comprises conditionally iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof.

2. The method according to claim 1, wherein the iteratively applying the genetic algorithm concurrently over the plurality of sub-sets of the defined set of orders and/or types of the candidate polynomials comprises iteratively applying the genetic algorithm concurrently over the plurality of sub-sets of the defined set of orders and/or types of the candidate polynomials on respective processors.

3. The method according to claim 1, wherein the iteratively applying the genetic algorithm over the variables of the candidate polynomials for each order and/or type of the respective sub-set thereof comprises:

selecting combinations of the variables of the candidate polynomials for each order and/or type of the respective sub-set thereof; and iteratively applying the genetic algorithm over the selected combinations of the variables of the candidate polynomials for each order and/or type of the respective sub-set thereof.

4. The method according to claim 3, wherein the iteratively applying the genetic algorithm over the selected combinations of the variables of the candidate polynomials for each order and/or type of the respective sub-set thereof comprises iteratively applying the genetic algorithm concurrently over the selected combinations of the variables of the candidate polynomials for each order and/or type of the respective sub-set thereof.

5. The method according to claim 4, wherein the iteratively applying the genetic algorithm concurrently over the selected combinations of the variables of the candidate polynomials for each order and/or type of the respective sub-set thereof comprises iteratively applying the genetic algorithm concurrently over the selected combinations of the variables of the candidate polynomials for each order and/or type of the respective sub-set thereof on respective threads.

6. The method according to claim 1, wherein the conditionally iteratively applying the genetic algorithm concurrently over the plurality of sub-sets of the defined set of orders and/or types of the candidate polynomials comprises terminating applying the genetic algorithm over the variables of the candidate polynomials for each order and/or type of the respective sub-set thereof if the respective scores do not meet a threshold.

7. The method according to claim 6, wherein the threshold is predetermined.

8. The method according to claim 6, further comprising determining the threshold based on a previous score.

9. The method according to claim 1, wherein the types of the candidate polynomials of the set thereof include univariate polynomials, multivariate polynomials and modifications thereof.

10. The method according to claim 1, wherein the generic polynomial is of the form:

$$y_n = \sum_{m=1}^{M_n} \alpha_{mn} x_1^{p_{1mn}} x_2^{p_{2mn}}$$

where:

$\alpha_{mn}$ represent the m coefficients required to compute output n;

$\{x_1 \ldots x_{Ni}\}$ represent the normalised inputs;

$\{y_1 \ldots y_{Ni}\}$ represent the outputs; and $p_{1mn}$ represents the exponent of the $x_1$ variable of the $m^{th}$ term of the $n^{th}$ polynomial.

11. A system for generating in an aircraft in flight, a feasibility display indicative of a feasibility of a weapon carried on the aircraft successfully engaging a target and/or a feasibility of a weapon carried on the target successfully engaging the aircraft, the system comprising:

a first computer comprising a memory and a processor, the first computer being remote from the aircraft; and a second computer comprising a memory and a processor, the second computer being onboard the aircraft, wherein the first computer is configured to:

provide a database describing a performance envelope of the weapon;

create coefficients characteristic of that performance envelope using a generic algorithm, wherein the generic algorithm has a form of a polynomial, the creating including:

a) generating candidate polynomials, variables of the candidate polynomials being some or all of a group of weapon or aircraft firing condition parameters;

b) for each candidate polynomial, computing coefficients for that candidate polynomial which best fit that candidate polynomial to a characteristic of the performance envelope of the weapon using a criterion of least square error;

c) for each candidate polynomial, generating a candidate score according to the quality of the fit of that candidate polynomial to the characteristic of the performance envelope of the weapon;

d) applying a genetic algorithm to the candidate polynomials and scores including selecting the best scoring candidate polynomial and discarding the other candidate polynomials, thereby identifying a best candidate polynomial and coefficients thereof; and e) repeating said identifying process until each of the characteristics of the performance envelope have corresponding polynomial models;

upload, to the second computer, the coefficients of the identified best candidate polynomial;

wherein the second computer is configured to:

select, by a reconstructor containing the same generic algorithm, coefficients for the generic algorithm according to conditions of the aircraft and the target; and using the selected coefficients, generate, by the reconstructor, the feasibility display;

wherein step d) applying the genetic algorithm to the candidate polynomials and scores comprises:

i) defining a set of orders and/or types of the candidate polynomials and dividing the defined set of orders and/or types into a plurality of sub-sets thereof;

ii) iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof; and iii) selecting the best scoring polynomial using the saved coefficients and scores and discarding the other candidate polynomials, thereby identifying the best candidate polynomial and coefficients thereof, wherein the second computer is configured to select, by the reconstructor containing the same generic algorithm, the coefficients for the generic algorithm according to conditions of the aircraft and the target, if the aircraft and the target are within the performance envelope of the weapon, according to the conditions of the aircraft and the target, and wherein the iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof comprises conditionally iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof.

12. The system according to claim 11, further comprising a display for displaying the feasibility display.

13. Two or more non-transitory computer-readable storage media comprising instructions for generating, in an aircraft in flight, a feasibility display indicative of a feasibility of a weapon carried on the aircraft successfully engaging a target and/or a feasibility of a weapon carried on the target successfully engaging the aircraft, the instructions which when executed by two or more processors, cause the two or more processors to perform;

creating coefficients characteristic of that performance envelope using a generic algorithm where there is a database provided describing a performance envelope of the weapon, wherein the generic algorithm has a form of a polynomial, the creating including:

a) generating candidate polynomials, variables of the candidate polynomials being some or all of a group of weapon or aircraft firing condition parameters;

b) for each candidate polynomial, computing coefficients for that candidate polynomial which best fit that candidate polynomial to a characteristic of the performance envelope of the weapon using a criterion of least square error;

c) for each candidate polynomial, generating a candidate score according to a quality of the fit of that candidate polynomial to the characteristic of the performance envelope of the weapon;

d) applying a genetic algorithm to the candidate polynomials and scores including selecting the best scoring candidate polynomial and discarding the other candidate polynomials, thereby identifying a best candidate polynomial and coefficients thereof; and e) repeating said identifying process until each of the characteristics of the performance envelope have corresponding polynomial models:

wherein, the coefficients of the identified best candidate polynomial are uploaded to the aircraft, wherein the instructions further cause the two or more processors to perform:

selecting, by a reconstructor on the aircraft containing the same generic algorithm, coefficients for the generic algorithm according to conditions of the aircraft and the target; and using the selected coefficients, generating, by the reconstructor, the feasibility display:

wherein step d) applying the genetic algorithm to the candidate polynomials and scores comprises:

i) defining a set of orders and/or types of the candidate polynomials and dividing the defined set of orders and/or types into a plurality of sub-sets thereof;

ii) iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof; and iii) selecting the best scoring candidate polynomial using the saved coefficients and scores and discarding the other candidate polynomials, thereby identifying the best candidate polynomial and coefficients thereof, wherein the selecting, by the reconstructor on the aircraft containing the same generic algorithm, the coefficients for the generic algorithm according to conditions of the aircraft and the target comprises selecting, by the reconstructor on the aircraft containing the same generic algorithm, the coefficients for the generic algorithm, if the aircraft and the target are within the performance envelope of the weapon, according to the conditions of the aircraft and the target, and wherein the iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof comprises conditionally iteratively applying the genetic algorithm concurrently over the plurality of sub-sets of the defined set of orders and/or types of the candidate polynomials, including iteratively applying the genetic algorithm over the variables of the candidate polynomials for each order and/or type of the respective sub-set thereof and saving the resulting respective coefficients and scores thereof.

14. The method according to claim 2, wherein the iteratively applying the genetic algorithm over the variables of the candidate polynomials for each order and/or type of the respective sub-set thereof comprises:

selecting combinations of the variables of the candidate polynomials for each order and/or type of the respective sub-set thereof; and iteratively applying the genetic algorithm over the selected combinations of the variables of the candidate polynomials for each order and/or type of the respective sub-set thereof.

15. The method according to claim 7, further comprising determining the threshold based on a previous score.

16. The method according to claim 2, wherein the generic polynomial is of the form:

$$y_n = \sum_{m=1}^{M_n} \alpha_{mn} x_1^{p1mn} x_2^{p2mn}$$

where:

$\alpha_{mn}$ represent the m coefficients required to compute output n;

$\{x_1 \ldots X_{Ni}\}$ represent the normalised inputs;

$\{y_1 \ldots y_{Ni}\}$ represent the outputs; and $p_{1mn}$ represents the exponent of the $x_1$ variable of the $m^{th}$ term of the $n^{th}$ polynomial.

* * * * *